(12) United States Patent
Canale et al.

(10) Patent No.: US 9,316,192 B2
(45) Date of Patent: Apr. 19, 2016

(54) GASEOUS-FUEL-INJECTOR DEVICE FOR INTERNAL-COMBUSTION ENGINES

(71) Applicant: FIAT POWERTRAIN TECHNOLOGIES S.P.A., Turin (IT)

(72) Inventors: Silvio Canale, Turin (IT); Antonio Gravina, Turin (IT)

(73) Assignee: FIAT POWERTRAIN TECHNOLOGIES S.P.A., Turin (IT)

( * ) Notice: Subject to any disclaimer, the term of this patent is extended or adjusted under 35 U.S.C. 154(b) by 542 days.

(21) Appl. No.: 13/708,341

(22) Filed: Dec. 7, 2012

(65) Prior Publication Data

US 2013/0206871 A1 Aug. 15, 2013

(30) Foreign Application Priority Data

Feb. 13, 2012 (EP) ..................................... 12155192

(51) Int. Cl.
*F02M 55/00* (2006.01)
*F02M 21/02* (2006.01)

(52) U.S. Cl.
CPC ......... *F02M 55/007* (2013.01); *F02M 21/0248* (2013.01); *Y02T 10/32* (2013.01)

(58) Field of Classification Search
CPC ............................... F02M 21/02; F02M 55/00
USPC ............... 239/88–92, 533.2, 583, 584, 585.1; 54/88–92, 533.2, 583, 584, 585.1
See application file for complete search history.

(56) References Cited

U.S. PATENT DOCUMENTS

| 5,348,233 | A * | 9/1994 | Press et al. | 239/585.3 |
| 2006/0043220 | A1* | 3/2006 | Leroux | 239/585.1 |
| 2007/0040052 | A1* | 2/2007 | Landi | 239/533.2 |
| 2009/0084873 | A1 | 4/2009 | Plaian | |
| 2011/0226975 | A1 | 9/2011 | Buse et al. | |

FOREIGN PATENT DOCUMENTS

| DE | 10 2008 048514 | 3/2010 |
| DE | 10 2008 060889 | 6/2010 |
| EP | 1 887 210 | 2/2008 |
| WO | WO 2006/111987 | 10/2006 |

OTHER PUBLICATIONS

Search Report for EP 12155192 dated Jun. 27, 2012.

* cited by examiner

*Primary Examiner* — Arthur O Hall
*Assistant Examiner* — Viet Le
(74) *Attorney, Agent, or Firm* — Nixon & Vanderhye P.C.

(57) ABSTRACT

In a gaseous-fuel-injector device for internal-combustion motor-vehicle engines, the valve body of the injector device has one or more auxiliary openings giving out onto an internal surface of the valve body in which the valve member of the injector device is slidably mounted. Said auxiliary openings are arranged in such a way as to enable the inflow of the gaseous fuel coming from the supply, not only into the inlet opening of the injector device, but also into the internal area of the valve body in which the valve member is slidably mounted, so as to obtain an effect of ventilation and flushing, by means of the flow of gaseous fuel, in an area where there tend to form deposits of the oily substances contained in the gaseous fuel.

4 Claims, 5 Drawing Sheets

GASEOUS-FUEL-INJECTOR DEVICE FOR INTERNAL-COMBUSTION ENGINES

This application is claims priority to EP 12155192.3 filed 13 Feb. 2012, the entire contents of each of which are hereby incorporated by reference.

FIELD OF THE INVENTION

The present invention regards gaseous-fuel-injector devices for internal-combustion engines of the type comprising:
- a valve body, defining at least one inlet opening designed to be connected to the supply of the gaseous fuel, at least one outlet opening designed to be in communication with a delivery nozzle, and a valve seat set in a path for connection between said inlet opening and said outlet opening;
- a valve member, co-operating with said valve seat and slidably mounted within an internal surface of said valve body between a closing position in contact with said valve seat, and an opening position at a distance from said valve seat;
- spring means within said valve body that push the valve member into said closing position; and
- an electromagnet carried by said valve body, which can be activated for recalling said valve member into its opening position, against the action of said spring means.

GENERAL TECHNICAL PROBLEM

In injector devices used in motor-vehicle engines supplied with gaseous fuel, in particular with LPG, there arises the drawback of an accumulation of deposits of pollutant substances with an oily base contained in the LPG that soil some internal areas of the device and in particular the surfaces within which the valve member is guided. Said deposits slow down the travel of the valve member even to the point of preventilation opening thereof. Slowing-down of the travel of the valve member causes a variation of the dynamic flowrate of the injector device. Consequently, the latter no longer manages to deliver the amount of fuel required by the engine, causing a malfunctioning thereof. The aforesaid oily deposits are linked to the thermal cycle between the temperature reached during operation of the engine and the temperature in conditions of engine turned off.

Currently, the only way to reduce the amount of oily deposits within the injector device is to improve the efficiency of the fuel filter with which the motor vehicle is provided.

OBJECT OF THE INVENTION

The object of the present invention is to solve the aforesaid problem with simple and low-cost means.

With a view to achieving said object, the subject of the invention is an injector device having the characteristics that have been indicated at the start and moreover characterized in that the aforesaid valve body has at least one auxiliary opening, which gives out onto said internal surface of the valve body slidably mounted in which is the valve member and is set in such a way as to enable inflow of the gaseous fuel coming from the supply, not only into said inlet opening, but also into the area inside said valve body slidably mounted within which is the valve member.

Preferably provided are a number of auxiliary openings on the valve body. Said openings function as ventilation openings that enable exploitation of the flow of gas at inlet to the injector device in order to obtain an effective flushing of the critical area in which the valve member is slidably mounted so as to obtain a direct evacuation of the oily deposits.

Consequently, thanks to the aforesaid characteristics, there is not only obtained the advantage of eliminating the drawback of formation of the deposits, but there is also a reduction in the performance required of the filtering apparatus, with consequent simplification and reduction of the cost of the latter.

BRIEF DESCRIPTION OF THE FIGURES

Further characteristics and advantages of the invention will emerge from the ensuing description, with reference to the annexed drawings, which are provided by way of non-limiting example and in which.

DETAILED DESCRIPTION OF THE INVENTION

Figure 1:
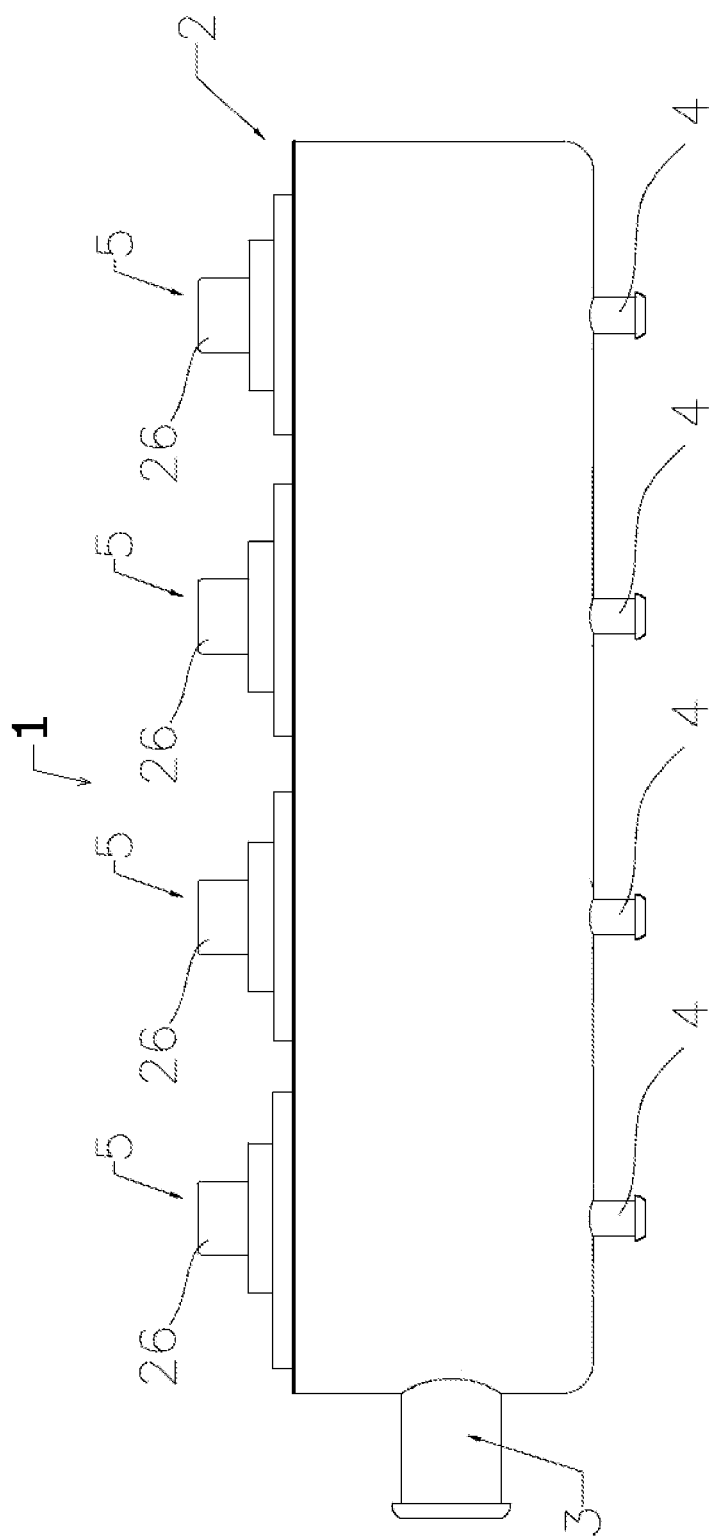
FIG. 1 is a side elevation of a rail for supply of the LPG to a four-cylinder internal-combustion engine, with a series of four injector devices associated thereto.
Figure 2:
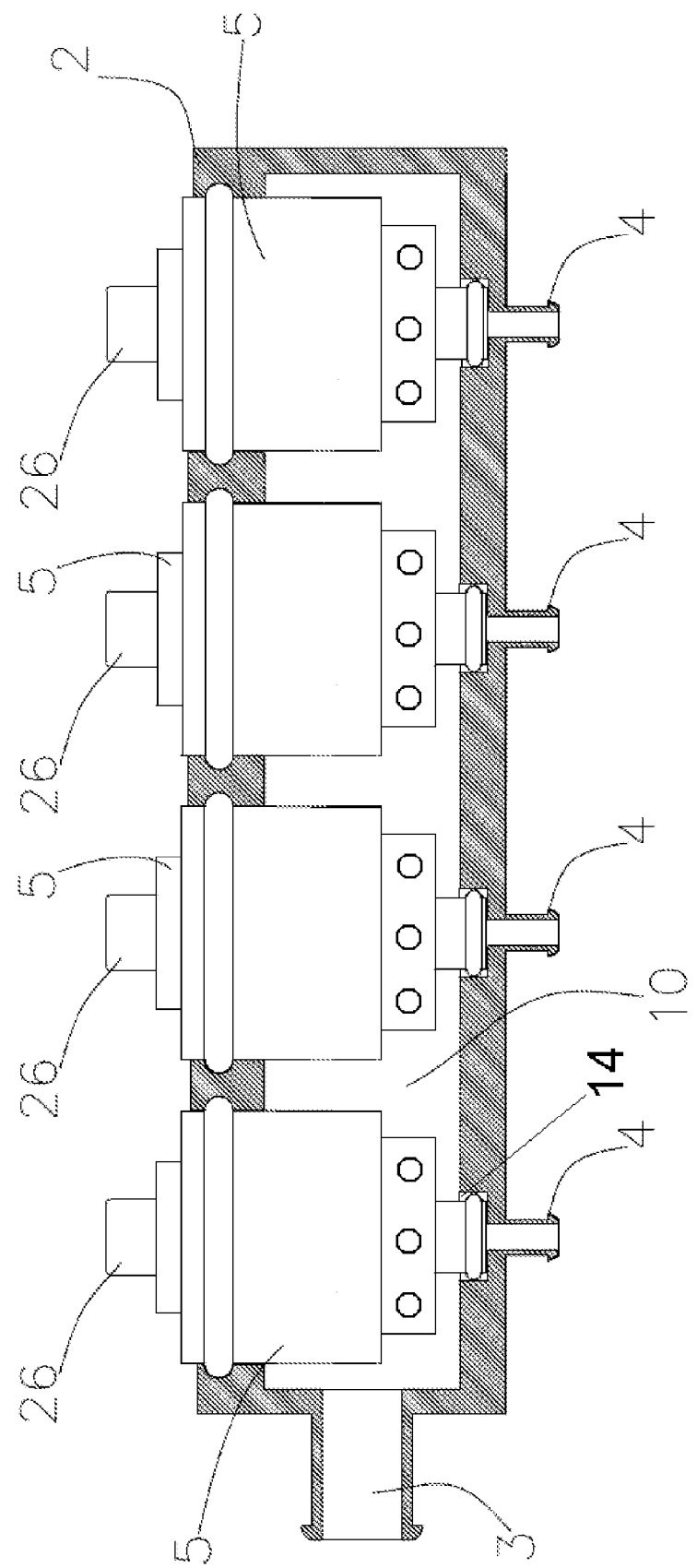
FIG. 2 is a cross-sectional view of the assembly of FIG. 1.

With initial reference to FIGS. 1 and 2, designated as a whole by 1 is a rail assembly for supply of the LPG to the cylinders of a four-cylinder internal-combustion engine. The assembly 1 comprises a body 2 having an inlet connector 3 designed to be connected to the system for supply of the LPG, and four outlet nozzles 4 designed to be connected to the intake pipes of the four cylinders of the engine. The LPG fuel coming from the connector 3 is supplied to the outlet nozzles 4 by means of as many injector devices 5.

Figure 3:
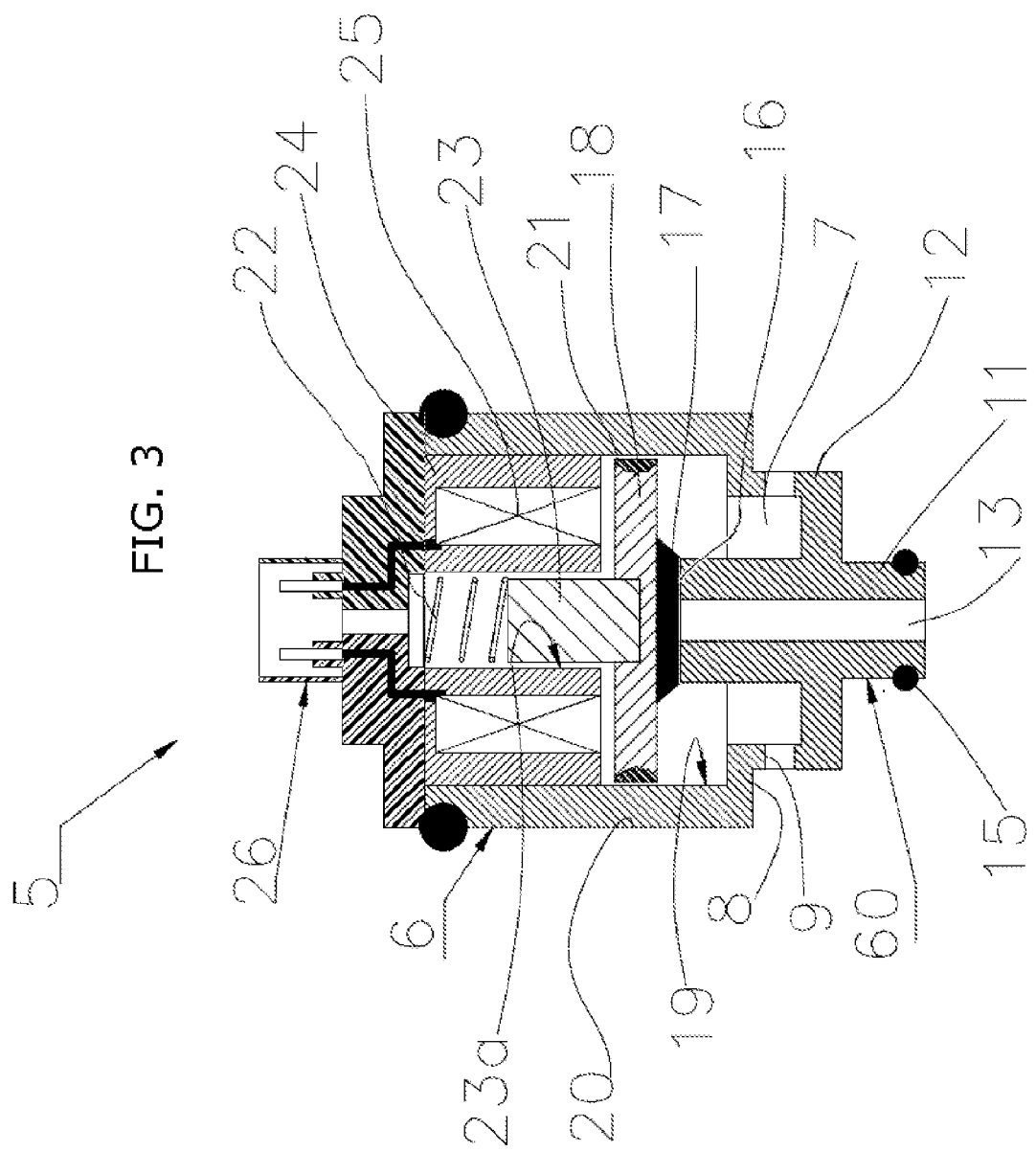
FIG. 3 is a diagrammatic cross-sectional view of an injector device according to the known art.

FIG. 3 illustrates an enlarged diagrammatic cross sectional view of one of the injector devices 5 according to the known art.

With reference to FIG. 3, the injector device 5 has a valve body 6 defining an internal annular chamber 7. The valve body 6 includes a first element 60 with a circumferential cylindrical wall 8, circumferentially distributed along which are a number of inlet openings 9 that give out onto the internal chamber 7 and are in communication with a rail 10 for supply of the LPG made within the body 2 (see FIG. 2) and communicating with the inlet connector 3. The gaseous fuel coming from the inlet connector 3 hence traverses the rail 10 and reaches the internal chamber 7 of each injector device 5, passing through the inlet openings 9.

The element 60 of the valve body 6 includes a cylindrical shaft 11, which extends both on the outside and on the inside of a front wall 12. Inside the wall 12, the shaft 11 delimits the chamber 7 on the radially inner side. Made through the shaft 6 is an axial passage 13 constituting the outlet opening for the gaseous fuel in the direction of the nozzle 4. The shaft 11 is received within a corresponding seat 14 made in the body 2 of the assembly with the interposition of a seal ring 15 (see also FIG. 2). The end surface of the shaft 11 within the chamber 7, designated by the reference number 16, constitutes a valve seat, co-operating with a valve member, constituted by an open/close element with a membrane 17 made of elastomeric or synthetic material, carried by a disk-shaped metal body 18. The disk-shaped body 18 is slidably received within the internal cylindrical surface 19 of a cup-shaped portion 20 of the element 60, said portion being made of a single piece with the cylindrical wall 8, the front wall 12, and the shaft 11. The disk 18 is provided on the outside with an annular sealing ring 21.

The valve member 17, 18 is pushed by a helical spring 22 into a closing position in contact with the valve seat 16, in which the communication between the inlet openings 9 and the outlet openings 13 is interrupted. The spring 22 acts on the disk 18 of the valve member by means of a stem 23 that is slidably mounted in a cylindrical central cavity 23a of an annular supporting body 24, which is fixed within the cup-shaped portion 20 and carries a solenoid 25. The solenoid 25, when activated, attracts the disk 18, against the action of the spring 22, into an opening position, in which the open/close element 17 is at a distance from the valve seat 16.

During operation, delivery of the gas in the intake rail of the engine takes place following upon of a lifting of the valve member 17, 18 such as to set the inlet openings 9 in communication with the outlet opening 13. Dosage of the fuel is carried out by controlling the time of opening of the valve member, which is obtained by means of an electronic control unit that manages electrical supply to the solenoid 25. Designated by 26 is the body of the connector for the electrical-supply cable of the solenoid.

Figure 4:
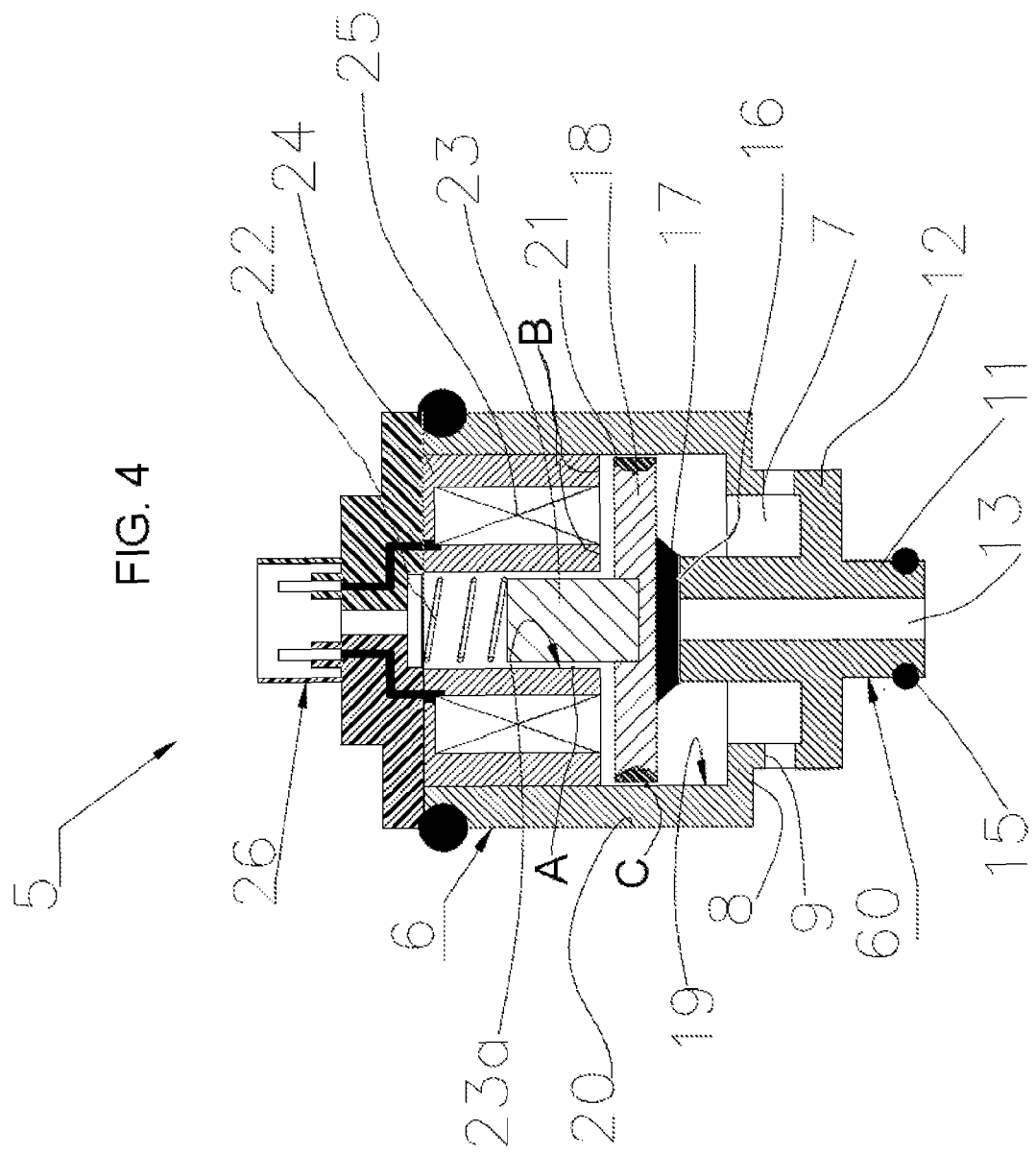
FIG. 4 shows the same cross-section of FIG. 3, with some additional references.

Designated in FIG. 4 by A, B and C are some internal areas of the injector device of a known type, which tend to get soiled owing to accumulation of oily deposits.

The accumulations in the area designated by A can lead to a cold sticking of the pin 23 within the respective cavity 23a, which can give rise to a delayed or absent opening of the injector device and to a consequent phenomenon of misfire of the engine.

Soiling in the areas designated by B cause a slowing-down of the descent of the valve member under the thrust of the spring 22 on account of an adhesive effect caused by the oily deposits, with consequent delayed closing of the injector device and a lack control of the air/fuel titre.

The deposits and soiling in the area designated by C cause a slowing-down of the valve member on account of the presence of sticky deposits in the area of sliding. This causes a delayed opening and/or a delayed closing, a drift in the control of the air/fuel titre, and phenomena of engine misfire.

Figure 5:
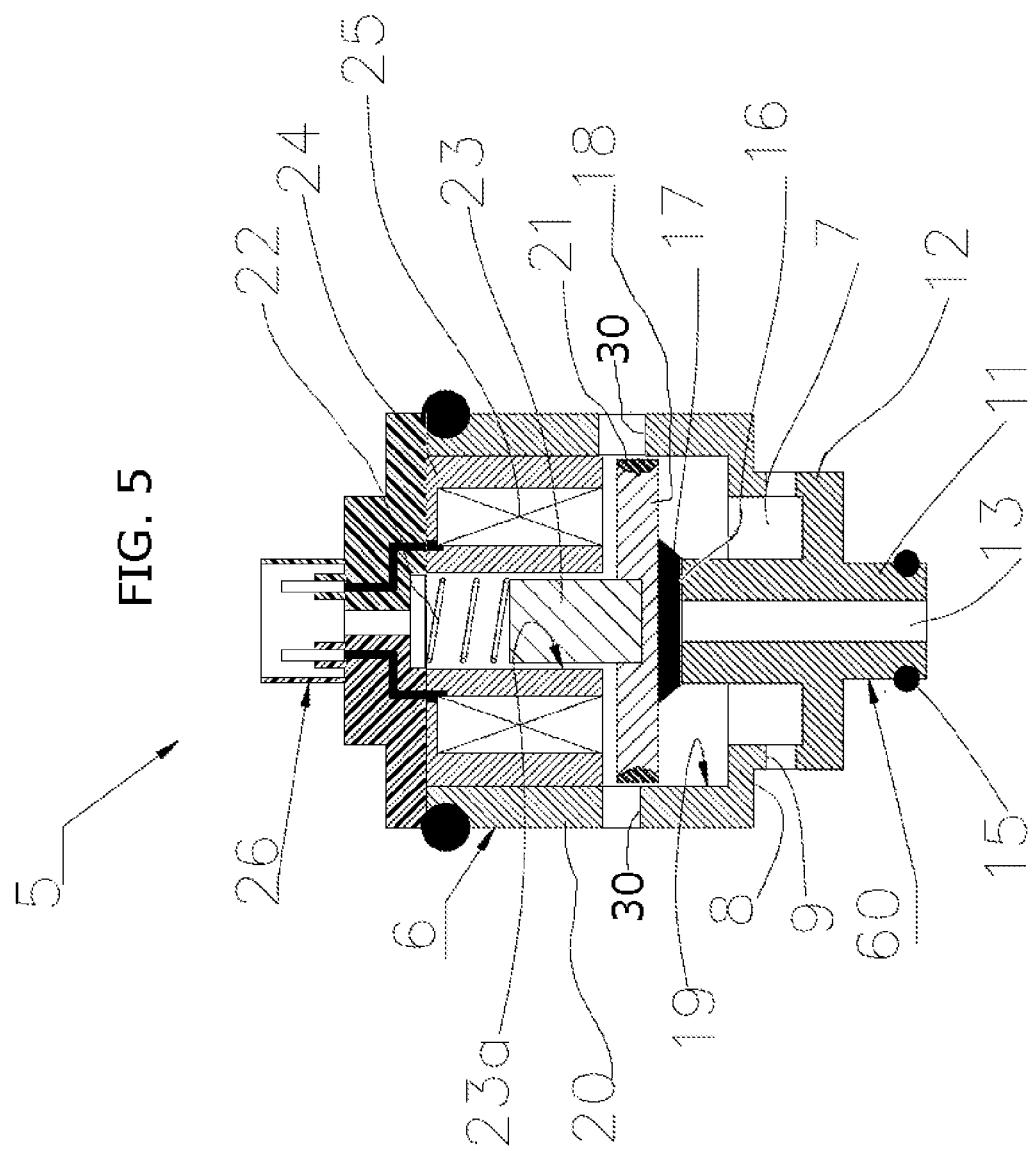
FIG. 5 shows the same injector device as that of FIGS. 3,4, but modified according to the teachings of the present invention.

FIG. 5 shows an example of embodiment of the invention, applied to the same injector device as the one illustrated in FIGS. 1-4. According to the invention, the valve body has one or more auxiliary openings 30 arranged in such a way as to enable a direct inflow of the gas coming from the inlet connector 3, not only into the chamber 7, but also into the area of the valve body in which the valve member 17, 18 is slidably mounted. In the example illustrated four holes 30 are provided in the wall of the cup-shaped portion 20, at the height of the disk 18 of the valve member. The holes 30 are also in communication with the rail 10 of the assembly 1. Consequently, the flow of gas coming from the rail 10 enters not only the chamber 7, but also the area where the valve member slides, evacuating the deposits possibly present both in said area and in the areas A and B already indicated above, which are immediately adjacent thereto. When the injector device is in the opening phase, also a flushing is obtained of the area where the valve member slides, thanks to setting-up of a flow of gas that enters directly through the auxiliary openings 30, reaches once again the chamber 7, and exits through the outlet opening 13 in the axial tubular projection 11.

As may be seen, thanks to the invention described above, there is obtained a simple and effective solution to the problem of soiling caused by the oily deposits and the also obtained is advantage of lowering the performance requirement for the fuel filter, with consequent possibility of adopting a simpler and less costly filter.

Of course, without prejudice to the principles of the invention, the details of construction and the embodiments may vary widely with respect to what is described and illustrated herein purely by way of example.

It is evident that the specific solution illustrated herein is suited to being applied to the type of injector device which has also been illustrated herein purely by way of example. In a different structure of injector device, the conformation and arrangement of the auxiliary openings designed to set up the ventilation effect by means of gas can be altogether different from the ones described herein.

What is claimed is:

1. An injector device for gaseous fuel, comprising:
a valve body, including:
a front wall,
a cylindrical wall extending on one side from said front wall,
an axial tubular projection having a first portion projecting from a bottom wall on a side within said cylindrical wall, so as to define an annular chamber between said cylindrical wall and said first portion of said tubular projection, said axial tubular projection also having a second portion projecting from said front wall on an opposite side with respect to said cylindrical wall,
said axial tubular projection having an axial passage extending throughout its length, between an inner end of the tubular projection located inside a space within said cylindrical wall and an outer end of said tubular projection located outside said space, said axial passage constituting an outlet passage for the gaseous fuel directed to a delivery nozzle, and the axial passage has an axis and is in a lower portion of the device,
said cylindrical wall having at least one main inlet for gaseous fuel to be supplied into said annular chamber,
said inner end of said tubular projection constituting a valve seat,
said device further comprising:
a valve member cooperating with said valve seat and carried by a metal disk, said disk being provided on its outer surface with a sealing ring and being slidably mounted within said cylindrical wall,
an annular supporting body mounted within said cylindrical wall on one end thereof opposite to said front wall,
a solenoid carried by said annular supporting body, controlling a stem slidably mounted within said annular supporting body and rigidly connected to said metal disk carrying said valve member,
at least one spring urging said stem and said metal disk with said valve member towards a valve closed position, where the valve member closes the communication of said annular chamber with said axial passage,
said solenoid being energizable to move said stem and said metal disk with said valve member towards a valve opened position, in which the valve member is spaced from said inner end of the tubular projection so as to open communication of said annular chamber with said axial passage,
wherein at least one auxiliary inlet opening is located above the at least one main inlet, in a direction that is away from the lower portion of the device, wherein the at least one auxiliary inlet opening is formed through a side portion of the valve body's cylindrical wall that is parallel to the axis of the axial passage, and wherein the at least one auxiliary opening opens toward the metal disk, so that when the valve member is in said valve opened position, a flow of gaseous fuel is established from said main inlet towards said axial passage, and a further flow of gaseous fluid is established from said at least one auxiliary inlet opening towards said axial passage, said further flow passing around said metal disk, and performing thereby a flushing action which prevents formation of deposits on areas of said injector device adjacent to said metal disk.

2. The injector device according to claim 1, wherein said at least one auxiliary opening is formed in a portion of said cylindrical wall which surrounds said metal disk, so that said at least auxiliary opening faces said disk.

3. An injector device for gaseous fuel, comprising:
a valve body, including:
a front wall,
a cylindrical wall extending on one side from said front wall,
an axial tubular projection having a first portion projecting from a bottom wall on a side within said cylindrical wall, so as to define an annular chamber between said cylindrical wall and said first portion of said tubular projection, said axial tubular projection also having a second portion projecting from said front wall on an opposite side with respect to said cylindrical wall,
said axial tubular projection having an axial passage extending throughout its length, between an inner end of the tubular projection located inside a space within said cylindrical wall and an outer end of said tubular projection located outside said space, said axial passage constituting an outlet passage for the gaseous fuel directed to a delivery nozzle, and the axial passage has an axis and is in a lower portion of the device,
said cylindrical wall having at least one main inlet for gaseous fuel to be supplied into said annular chamber,
said inner end of said tubular projection constituting a valve seat,
said device further comprising:
a valve member cooperating with said valve seat and carried by a metal disk, said disk being provided on its outer surface with a sealing ring and being slidably mounted within said cylindrical wall,
an annular supporting body mounted within said cylindrical wall on one end thereof opposite to said front wall,
a solenoid carried by said annular supporting body, controlling a stem slidably mounted within said annular supporting body and rigidly connected to said metal disk carrying said valve member,
at least one spring urging said stem and said metal disk with said valve member towards a valve closed position, where the valve member closes the communication of said annular chamber with said axial passage,
said solenoid being energizable to move said stem and said metal disk with said valve member towards a valve opened position, in which the valve member is spaced from said inner end of the tubular projection so as to open communication of said annular chamber with said axial passage,
wherein at least two auxiliary inlet openings are located above the at least one main inlet, in a direction that is away from the lower portion of the device, wherein the at least two auxiliary inlet openings are separately formed through separate side portions of the valve body's cylindrical wall that is parallel to the axis of the axial passage, and wherein the at least two auxiliary inlet openings open toward the metal disk, so that when the valve member is in said valve opened position, a flow of gaseous fuel is established from said main inlet towards said axial passage, and a further flow of gaseous fluid is established from said at least two auxiliary inlet openings toward said axial passage, said further flow passing around said metal disk, and performing thereby a flushing action which prevents formation of deposits on areas of said injector device adjacent to said metal disk.

4. The injector device according to claim 3, wherein said at least two auxiliary openings are formed through separate portions of said cylindrical wall which surrounds said metal disk, so that said at least two auxiliary openings face said metal disk.

\* \* \* \* \*